United States Patent
Lutz et al.

(10) Patent No.: US 7,761,989 B2
(45) Date of Patent: Jul. 27, 2010

(54) METHODS FOR REPAIRING GAS TURBINE ENGINE COMPONENTS

(75) Inventors: Andrew J. Lutz, Glastonbury, CT (US); John Finn, Northford, CT (US)

(73) Assignee: United Technologies Corporation, Hartford, CT (US)

(*) Notice: Subject to any disclaimer, the term of this patent is extended or adjusted under 35 U.S.C. 154(b) by 1154 days.

(21) Appl. No.: 11/284,613

(22) Filed: Nov. 22, 2005

(65) Prior Publication Data

US 2007/0113402 A1 May 24, 2007

(51) Int. Cl.
*B23P 6/00* (2006.01)
(52) U.S. Cl. .............. 29/889.1; 29/402.09; 29/402.11; 29/402.16; 29/402.18; 218/118; 218/119
(58) Field of Classification Search .............. 29/889.1, 29/402.09, 402.11, 402.16, 402.18; 218/118, 218/119
See application file for complete search history.

(56) References Cited

U.S. PATENT DOCUMENTS

| | | | |
|---|---|---|---|
| 4,574,451 A | | 3/1986 | Smashey et al. |
| 4,726,104 A | * | 2/1988 | Foster et al. ............... 29/889.1 |
| 5,033,938 A | * | 7/1991 | Fraser et al. .............. 416/224 |
| 5,340,530 A | * | 8/1994 | Coulon ..................... 419/5 |
| 5,935,718 A | * | 8/1999 | Demo et al. .............. 428/577 |
| 6,516,865 B1 | * | 2/2003 | Beeck et al. .............. 164/76.1 |
| 6,742,698 B2 | | 6/2004 | Shah et al. |
| 7,028,881 B2 | * | 4/2006 | Ditzel et al. .............. 228/216 |
| 2003/0034379 A1 | * | 2/2003 | Jackson et al. ............ 228/119 |
| 2006/0248719 A1 | * | 11/2006 | Szela et al. ................ 29/889.7 |

FOREIGN PATENT DOCUMENTS

| | | |
|---|---|---|
| JP | 59155504 A | 9/1984 |
| JP | 2004074395 A | 11/2004 |

OTHER PUBLICATIONS

Japanese Office Action, dated Jun. 2, 2009.

* cited by examiner

*Primary Examiner*—David P Bryant
*Assistant Examiner*—Sarang Afzali
(74) *Attorney, Agent, or Firm*—Bachman & LaPointe, P.C.

(57) ABSTRACT

A method for repairing a gas turbine engine component includes the steps of repairing one of a suction side or a pressure side of the component; repairing internal geometry of the component after one of the suction side or the pressure side of the component is repaired; and repairing the other of the suction side and the pressure side of the component after the internal geometry of the component is repaired, wherein a backing material is utilized to preserve the internal geometry of the component when the other of the suction side and the pressure side of the component is being repaired.

26 Claims, 1 Drawing Sheet

METHODS FOR REPAIRING GAS TURBINE ENGINE COMPONENTS

FIELD OF USE

The present application relates to methods for repairing parts, and more particularly, to methods for repairing various damage experienced by gas turbine engine components.

BACKGROUND OF THE INVENTION

Frequently expensive gas turbine engine components, like turbine blades and vanes, experience burn-through, diffusion-controlled deformation ("creep"), cyclic loading and unloading ("fatigue"), chemical attack by hot gas flow ("oxidation"), wear from rubbing contact between blade tips and turbine shrouds, wear from the impact of particles entrained in the gas flow ("erosion"), foreign object damage ("FOD"), and the like, throughout their extended service. Although such damage to the exterior of the component may be relatively small, the damage experienced by the internal geometry designed to direct a cooling airflow within the component may be more severe. In fact, the damage may be severe enough to affect or damage the internal configuration of the component. Defects of this nature are often sufficient to cause rejection of the component. In certain instances, the defect is of such a nature that repairs would be satisfactory. However, lacking a suitable means for reliably repairing such defects, these blades and vanes are often scrapped.

Current welding techniques may introduce additional problems beyond the existing damage. For instance, the weld material may flow into the exposed internal geometry and result in a rejectable condition. In other areas, such as a trailing edge, weld repair may result in the closure of the internal geometry, such as internal cooling features, that may then need to be re-established by labor intensive blending or electrodischarge machining.

Consequently, there exists a need for a satisfactory repair technique for restoring both the external features and internal geometry of damaged parts.

There also exists a need for a satisfactory repair technique for restoring the internal geometry of a part in accordance with the original design specifications.

There also further exists a need for a satisfactory repair technique for restoring the internal geometry of a part and maintaining the symmetry of the internal core.

SUMMARY OF THE INVENTION

In accordance with the present invention, a method for repairing a gas turbine engine component broadly comprises repairing one of a suction side or a pressure side of the component; repairing internal geometry of the component after one of the suction side or the pressure side of the component is repaired; and repairing the other of the suction side and the pressure side of the component after the internal geometry of the component is repaired, wherein a backing material is utilized to preserve the internal geometry of the component when the other of the suction side and the pressure side of the component is being repaired.

In accordance with the present invention, a method for repairing damage experienced by a part broadly comprises removing at least a first portion of a damaged area from one or more sides of a part; applying a repair material in an amount sufficient to fill at least the first portion of only one of the sides of the part; welding the repair material in the first portion of the one side of the part; blending the repair material with a contour and a wall thickness both internally and externally of the first portion of the one side of the part to form a restored portion; applying the repair material in an amount sufficient to restore at least a portion of one or more internal features of the restored portion of the part; welding the repair material in the portion of the one or more internal features; blending said repair material with a contour of the one or more internal features of the restored portion of the part; applying a backing material to at least a second portion of the restored area of the part; applying the repair material in an amount sufficient to fill at least the second portion of the part; welding the repair material in the second portion of the part; blending the repair material in the second portion of the part to restore the contour of the second portion of the part; and removing the backing material from the part.

In accordance with the present invention, a repaired gas turbine engine component broadly comprises a suction side; a pressure side; and an internal cavity disposed between the suction side and the pressure side, wherein one of the suction side or the pressure side is first repaired to predetermined dimensions and geometry, then the internal cavity is repaired to predetermined dimensions and geometry, then the other of the suction side or the pressure side is repaired to predetermined dimensions and geometry by utilizing a backing material to preserve the internal cavity.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

In accordance with the present invention, a method of repairing damage experienced by a part is described herein. The method restores both the external features and internal geometry of the damaged part in accordance with the original design specifications while also maintaining the symmetry of the part's internal core and features. The damage experienced by the part may be, but is not limited to, burn-through, diffusion-controlled deformation ("creep"), cyclic loading and unloading ("fatigue"), chemical attack by hot gas flow ("oxidation"), wear from rubbing contact between blade tips and turbine shrouds, wear from the impact of particles entrained in the gas flow ("erosion"), foreign object damage ("FOD"), combinations of the foregoing types of damage, and the like.

Figure 1:
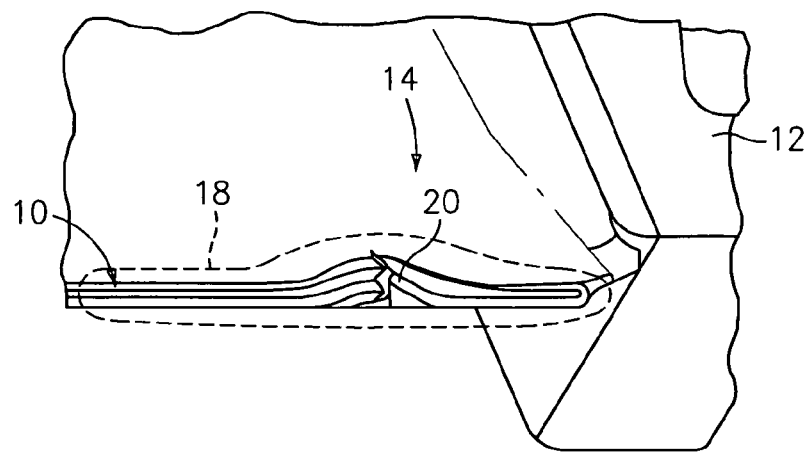
FIG. 1 is a schematic diagram illustrating a gas turbine engine vane that experienced foreign object damage to the trailing edge and internal ribs.
Figure 2:
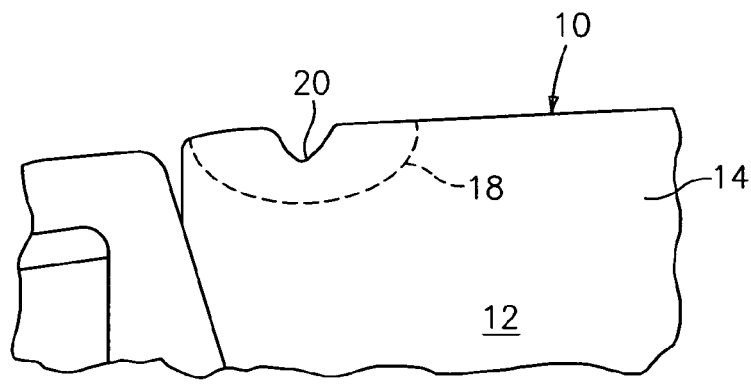
FIG. 2 is a schematic diagram illustrating a side view of the damaged gas turbine engine vane of FIG. 1.
Figure 3:
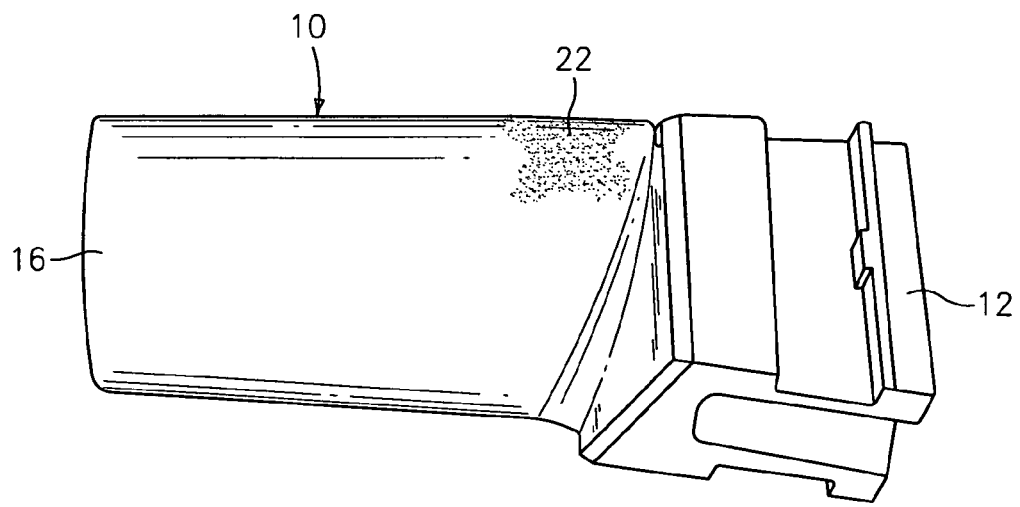
FIG. 3 is a schematic diagram illustrating a side view of the gas turbine engine vane of FIG. 1 after being repaired using the method(s) described herein.

Referring generally now to FIGS. 1-3, a trailing edge 10 of a gas turbine engine component 12 to be repaired is illustrated. Trailing edge 10 comprises a suction side 14, a pressure side 16 and a damaged area 18 to be repaired. Trailing edge 10 has an exposed internal cavity 20 in damaged area 18. In such a circumstance, it is necessary that the exposed internal cavity 18 be protected from the introduction of the repair material. To this end, the methods described herein incorporate repairing either suction side 14 or pressure side 16, and then repairing exposed internal cavity 20 to maintain the symmetry of the internal core and features. Then, as described in U.S. Pat. No. 6,742,698, which is incorporated by reference herein in its entirety, a backing material may be employed to prevent closure of trailing edge 10 when welding the other of suction side 14 or pressure side 16. Restored areas 22 may then be inspected to ensure quality control measures are satisfactorily met.

Referring specifically now to FIG. 1, at least a portion of damaged area 18 is removed (i.e., routed out) using any suitable method known to one of ordinary skill in the art such that an amount of material sufficient to remove the damage and its surrounding area is removed as shown in FIG. 2.

Once the damage has been removed, a repair material may be applied to fill at least the removed portion of either suction side 14 or pressure side 16 of trailing edge 10 of part 12. Preferably, only one side is filled in order to permit one skilled in the art to then, in a future step, restore the internal geometry of exposed internal cavity 20 to its original OEM condition. The amount of repair material applied should be sufficient to fill the removed portion of the one side (i.e., either suction side 14 or pressure side 16). The repair material may be applied using any suitable conventional method known to one of ordinary skill in the arts including but not limited to beading. Generally, the repair material may comprise any material compatible with the base alloy used to construct the part 12. Suitable repair materials compatible with base alloys of turbine engine components may comprise any nickel-based alloy such as IN-939 commercially available from INCO (originally the International Nickel Corporation), of Wexford, Pa.; C263 commercially available from MM Aerospace Metals Inc., of Fort Lauderdale, Fla.; similar alloys containing nickel, other related superalloys containing nickel, and combinations comprising at least one of the foregoing nickel-based alloys, etc. Once applied to the removed portion of the one side (i.e., either suction side 14 or pressure side 16), the repair material may then be welded into place using any suitable welding method known to one of ordinary skill in the art.

The welded portion and surrounding area may then be blended to the desired contour and wall thickness of trailing edge 10 of part 12. The contour of part 12 generally constitutes the shape and features originally present in the part. Blending the welded portion may be accomplished using any suitable method known to one of ordinary skill in the art including but not limited to milling, grinding, sanding, super-abrasive machining, and combinations comprising at least one of the foregoing methods, etc. In embodiments, the welded area may be blended by manually grinding or super-abrasive machining the area until the welded portion and surrounding area conform to the original contour of trailing edge 10. In the alternative, a preform may be utilized in order to accurately restore the welded portion and surrounding area to the original contour of trailing edge 10. The preform may be applied to the surface of part 12 including the welded portion prior to blending the welded portion and surrounding area.

Once one side (i.e., either suction side 14 or pressure side 16) of trailing edge 10 is welded, the repair material may then be applied to restore the internal geometry and features of exposed internal cavity 20 to desired conditions. The present method permits one skilled in the art to restore the internal geometry of exposed internal cavity 20 to its original OEM condition. One skilled in the art may repair the internal cavity and its features, such as cooling channels, by relying upon the visibly present symmetrical natures of the internal cavity. The amount of repair material applied should be sufficient to restore the features. The repair material may be applied using any suitable conventional method known to one of ordinary skill in the arts including but not limited to beading. As described earlier, the repair material may comprise any material compatible with the base alloy used to construct the part 12. Suitable repair materials compatible with base alloys of turbine engine components may comprise any nickel-based alloy such as IN-939® commercially available from INCO (originally the International Nickel Corporation), of Wexford, Pa.; C263® commercially available from MM Aerospace Metals Inc., of Fort Lauderdale, Fla.; similar alloys containing nickel, other related superalloys containing nickel, and combinations comprising at least one of the foregoing nickel-based alloys, etc. Once applied to the internal features of part 12, the repair material may then be welded into place using any suitable welding method known to one of ordinary skill in the art.

The welded portion and surrounding area of the internal features may then be blended to the desired contour of trailing edge 10 of part 12. The contour of part 12 generally constitutes the shape and features originally present in the part. Blending the welded portion may be accomplished using any suitable method known to one of ordinary skill in the art including but not limited to milling, grinding, sanding, super-abrasive machining, and combinations comprising at least one of the foregoing methods, etc. In embodiments, the welded area may be blended by manually grinding or super-abrasive machining the area until the welded portion and surrounding area conform to the original contour of the internal features of part 12. In the alternative, a preform may be utilized in order to accurately restore the welded portion and surrounding area to the original contour of the internal features of part 12. The preform may be applied to the surface of part 12 including the welded portion prior to blending the welded portion and surrounding area.

Once one side of trailing edge 10 (i.e., either suction side 14 or pressure side 16) and the internal features of part 12 are restored, the second side of trailing edge 10 (i.e., the other of suction side 14 or pressure side 16) of part 12 may be welded to fully restore part 12. In embodiments, a backing material may be utilized to prevent inadvertent damage to internal cavity 20 when the second side (i.e., the other of suction side 14 or pressure side 16) of trailing edge 10 is being repaired. A piece of backing material comprising a refractory metal material may be positioned over the area to be repaired of trailing edge 10 to prevent the entry of the repair material into internal cavity 20. Suitable refractory metal material may possess a melting point in excess of 1455° C. (2651° F.), and most preferably a melting point in excess of 1650° C. (3000° F.). Suitable refractory metal materials may include, but are not limited to, niobium, tantalum, molybdenum and tungsten; metals having a melting point higher than the melting point of nickel, such as platinum, iridium, and the like, and their alloys, etc.

The backing material may be uncoated or coated. If heat input of the repair is high, a diffusion barrier coating can be applied to the refractory material. Candidates include, but are not limited to, oxide ceramics such as alumina or mullite, etc. If an oxide ceramic coating is used, an intermediate coating layer such as a silicide may be used to help coating adherence. When coated with ceramic, it may be preferable to nickel plate over the alumina or mullite to aid in wetting the repair filler metal. The coating system may also include a nickel aluminide layer left behind after repair to improve the oxidation resistance of the coating. Alternatively, the refractory metal backing material may just be nickel plated using electrolytic nickel on at least one side, if heat input is low. As previously mentioned, the presence of the coating enhances the wettability of the backing material during the subsequent welding process.

The backing material may be cut to conform to the shape of trailing edge 10 and internal cavity 20. The backing material, preferably in a foil form, may be placed over the area to be repaired of trailing edge 10. Any suitable cutting technique known in the art such as laser cutting, photo etching, stamping, or water jet cutting, etc. may be utilized to cut the backing material. After the backing material has been positioned in trailing edge 10, the repair material described above may be deposited over the backing material and subjected to a welding operation. The repair material should be deposited in an amount sufficient to fill the area to be repaired of trailing edge 10. As described earlier, the repair material may also comprise any material compatible with the base alloy used to construct the part. Once applied to trailing edge 10 of part 12, the repair material may then be welded into place using any suitable welding method known to one of ordinary skill in the art. During the welding step, the heat input may be kept low to prevent alloying.

The welded portion and surrounding area of trailing edge 10 may then be blended to the contour of part 12. The contour of part 12 generally constitutes the shape and features originally present. Blending the welded portion may be accomplished using any blending methods previously described herein or, in the alternative, a preform may be utilized as described earlier.

Once the repair material has solidified, the backing material may be removed by any suitable method. In embodiments, the backing material may be removed by an acid chemical treatment using a nitric acid-sulfuric acid solution. This solution may have 2 parts nitric acid and 1 part sulfuric acid added to 2 parts water. The mixture is preferably heated to a temperature up to 150° F. to increase the dissolution rate.

In other embodiments, the backing material may be removed using an oxidizing heat treatment in which air is flowed through the interior of the gas turbine engine component 12. The flowing air may be at a temperature of about 1400° F. to 1650° F. and may be flowed through interior cavity 20 for a period of about 1 hour to 4 hours. The oxidizing heat treatment may be performed either in a furnace or by direct resistant heating.

The removal of the backing material may be omitted if the alloying of the refractory metal with filler material is controlled.

The present invention is advantageous in that it allows a refractory metal material to act as a weld backing material to allow welding over open cavities or to re-establish internal cooling geometry in a part. The refractory metal material can later be removed if desired without the need for extensive post welding blend processing or machining such as EDM machining. This method has particular utility in the repair of investment castings.

It is to be understood that the invention is not limited to the illustrations described and shown herein, which are deemed to be merely illustrative of the best modes of carrying out the invention, and which are susceptible to modification of form, size, arrangement of parts, and details of operation. The invention rather is intended to encompass all such modifications which are within its spirit and scope as defined by the claims.

What is claimed is:

1. A method for repairing a gas turbine engine component comprising: repairing one of a suction side or a pressure side of said component; wherein repairing one of said suction side or said pressure side comprises the steps of:
    applying a repair material in an amount sufficient to repair at least one of a first portion of said suction side or a first portion of said pressure side;
    welding said repair material in at least one of said first portion of said suction side or said first portion of said pressure side; and
    blending said repair material in said first portion with a contour and a wall thickness both internally and externally of one of said first portion of said suction side or said first portion of said pressure side;
    repairing internal geometry of said component after one of the suction side or the pressure side of said component is repaired; and
    repairing the other of said suction side and said pressure side of said component after said internal geometry of said component is repaired, wherein a backing material is utilized to preserve the internal geometry of said component when the other of said suction side and said pressure side of said component is being repaired.

2. The method of claim 1, wherein repairing the other of said suction side or said pressure side comprises the steps of:
    applying said backing material to at least a portion of the other of said suction side or said pressure side;
    applying a repair material in an amount sufficient to repair at least the other of a second portion of said suction side or a second portion of said pressure side;
    welding said repair material in said second portion of said component;
    blending said repair material in said second portion of said component to restore a contour of said second portion of said component; and
    removing said backing material from said part.

3. The method of claim 1, wherein said backing material further comprises at least one coating layer.

4. The method of claim 3, wherein said at least one coating layer is selected from the group consisting of oxides of ceramics, oxides of silicon and oxides of nickel-aluminum.

5. The method of claim 3, wherein said at least one coating layer is nickel plating.

6. The method of claim 2, further comprising inspecting said component once said backing material is removed.

7. The method of claim 6, wherein inspecting comprises at least one of:
    performing a fluorescent penetration inspection of at least said restored contour of said second portion of said component; and
    performing an x-ray inspection of at least said restored contour of said second portion of said component.

8. The method of claim 2, wherein said repair material comprises an alloy compatible with a base alloy of said component.

9. The method of claim 8, wherein said repair material comprises a nickel-based alloy.

10. The method of claim 2, wherein applying said repair material comprises applying said repair material to at least the other of a second portion of a trailing edge of said suction side or a second portion of a trailing edge of said pressure side.

11. The method of claim 2, wherein applying said repair material comprises applying said repair material in an amount sufficient to restore a wall thickness of at least the other of said second portion of said suction side or said second portion of said pressure side.

12. The method of claim 2, wherein applying said backing material comprises applying said backing material into at least the other of a second portion of a trailing edge of said suction side or a second portion of a trailing edge of said pressure side.

13. The method of claim 2, wherein blending comprises blending said repair material by using a method selected from the group consisting of milling, grinding, sanding and super-abrasive machining.

14. The method of claim 2, wherein removing comprises at least one of:

leaching said backing material out of said part; and
   heating to remove said backing material from said part.

15. The method of claim 1, wherein said backing material comprises a metal comprising refractory characteristics.

16. The method of claim 1, wherein said backing material comprises at least one metal selected from the group consisting of niobium, tantalum, molybdenum and tungsten.

17. The metal of claim 1, wherein said backing material is platinum, iridium or their alloys.

18. The method of claim 1, wherein repairing internal geometry comprises the steps of:

applying a repair material in an amount sufficient to repair at least a portion of said internal geometry of said repaired first portion of said component;
   welding said repair material in said internal geometry of said component; and
   blending said repair material with a contour of said internal geometry of said component.

19. The method of claim 18, wherein said repair material comprises an alloy compatible with a base alloy of said component.

20. The method of claim 19, wherein said repair material comprises a nickel-based alloy.

21. The method of claim 18, wherein blending comprises blending said repair material by using a method selected from the group consisting of milling, grinding, sanding and super-abrasive machining.

22. The method of claim 1, wherein said repair material comprises an alloy compatible with a base alloy of said component.

23. The method of claim 22, wherein said repair material comprises a nickel-based alloy.

24. The method of claim 1, wherein applying comprises applying said repair material to at least one of a first portion of a trailing edge of said suction side or a first portion of a trailing edge of said pressure side.

25. The method of claim 1, wherein applying comprises applying said repair material in an amount sufficient to restore a wall thickness of at least one of said first portion of said suction side or said first portion of said pressure side.

26. The method of claim 1, wherein blending comprises blending said repair material by using a method selected from the group consisting of milling, grinding, sanding and super-abrasive machining.

* * * * *